United States Patent
Kowalski et al.

[15] 3,650,263
[45] Mar. 21, 1972

[54] MONITORING SYSTEM

[72] Inventors: William W. Kowalski; James R. Ricketts, both of Milwaukee, Wis.

[73] Assignee: Marquette Electronics, Inc., Milwaukee, Wis.

[22] Filed: Nov. 3, 1969

[21] Appl. No.: 873,293

[52] U.S. Cl. ..............................128/2.06 G, 179/100.2 MD
[51] Int. Cl. ..........................................................A61b 5/04
[58] Field of Search ................128/2.05 Q, 2.06 A, 2.06 F, 128/2.06 G, 2.06 R, 2.1 A, 2.1 R; 346/17; 179/100.2 S, 100.2 Z, 100.2 MI

[56] References Cited

UNITED STATES PATENTS

| | | | |
|---|---|---|---|
| 2,848,992 | 8/1958 | Pigeon | 128/2.06 F |
| 2,992,296 | 7/1961 | Albrecht | 179/100.2 MI |
| 3,221,334 | 11/1965 | Jones, Jr. | 128/2.06 G |
| 3,229,687 | 1/1966 | Holter et al. | 128/2.06 A |
| 3,238,532 | 3/1966 | Michel, Jr. et al. | 346/17 |
| 3,327,067 | 6/1967 | Boniface | 179/100.2 Z |
| 3,426,150 | 2/1969 | Tygart | 128/2.06 R |

Primary Examiner—William E. Kamm
Attorney—Andrus, Sceales, Starke & Sawall

[57] ABSTRACT

The electrocardiographic signals are continuously recorded along a track on an endless magnetic tape within the portable magnetic tape recorder as the subject goes about his normal activities so that the most recently occurring electrocardiographic signals are always on the tape unless the frequency of the QRS complex signals departs from a range previously set into an electronic range detector, in which case the motor is stopped after a predetermined time delay that causes the tap to contain the signals occurring prior to the time of the departure from the range on half of the tape and the signals occurring after the departure from the range on the other half of the tape. An audible alarm is sounded when the motor stops so that the subject may change magnetic tapes and may make a note of his activities at the time the ORS complex signals departed from the range set on the detector.

25 Claims, 7 Drawing Figures

INVENTORS
William W. Kowalski
James R. Ricketts
BY Fidler, Bradley & Patnaude
Attys.

INVENTORS
William W. Kowalski
BY James R. Ricketts

Attys.

INVENTORS
William W. Kowalski
James R. Ricketts
BY
Attys.

MONITORING SYSTEM

This invention relates to systems that utilize a portable recorder to monitor electrocardiographic signals of an ambulatory subject.

To monitor electrocardiographic signals of an ambulatory subject, electrodes are affixed to the skin of the subject and pickup signals are recorded by a portable recorder carried by the ambulatory subject during his normal activities. The recorded signals are later examined to correlate the electrocardiographic signals with specific activities of the ambulatory subject during the day. This information is useful in diagnosing heart difficulties and, moreover, reduces the expense necessary to observe a subject over a long period of time because the subject is not maintained in an intensive care ward.

In the prior art systems for monitoring the electrocardiographic signals from an ambulatory subject, the subject carries a portable tape recorder that continually receives the electrocardiographic signals from the electrodes affixed to the subject and records them on a long magnetic tape that is driven at a relatively slow speed with respect to the recording heads. In the portable recorder, the signals received from the electrodes are filtered to pass only the electrocardiographic signal to be recorded in amplitude modulated form on the magnetic tape.

The prior art systems for monitoring electrocardiographic signals, have several disadvantages which result from the use of a portable tape recorder that records continuously on a long tape, which disadvantages are: (1) the fidelity of the signals on the tape is poor; (2) it is difficult to locate signals of interest on the tape because of its length; (3) expensive playback equipment is necessary to scan the long tape rapidly for the purpose of locating electrocardiographic signals of particular interest; and (4) the electrocardiographic signals of particular interest are not easily correlated with the activities of the subject that caused the signals of special interest.

Accordingly, it is an object of the invention to provide an improved method for monitoring the heartbeat of a subject.

It is a still further object of the invention to provide an improved portable tape recorder for monitoring the heartbeat of a subject.

It is a still further object of this invention to provide a recording system in which signals are recorded with good fidelity even though the tape is moved slowly past the recording head.

It is a still further object of this invention to provide a system for recording electrocardiographic signals, which system enables the electrocardiographic signal to be easily correlated with the activity of the subject that originates the signals.

It is a still further object of the invention to provide an inexpensive recording and playback system.

In accordance with the above and further objects of the invention, a monitoring system is provided that includes a portable tape recorder, electrodes which are adapted to be fastened to a subject and electrically connected to the portable tape recorder, and a playback unit for the magnetic tape from the recorder. The portable tape recorder is carried by the subject during his normal activities and receives signals from the electrodes attached to the subject during this time. The electrocardiographic signals are FM-modulated and recorded on a slowly moving endless magnetic tape along with a parallel timing track. The endless magnetic tapes are later played back in the playback unit at a speed that is controlled by the timing track on the magnetic tapes. The signals recorded on the tapes are demodulated and reviewed to diagnose the condition of the heart of the subject.

The portable recorder includes a recording channel and a control channel.

The recording channel frequency modulates the electrocardiographic signal and applies the signal to a recording head for recording along a data track on the rotating endless magnetic tape. The signal is recorded by FM-saturation recording to replace the previously recorded signal on the track so that the tape always has the most recently generated electrocardiographic signals recorded upon it.

The control channel receives the electrocardiographic signal and filters it to remove all components except the filtered QRS complex signal. The QRS complex signal is detected in the control channel to provide a DC-output potential that varies in proportion to the frequency of the QRS complex signal. This varying DC potential is applied to an electronic range detector in the control channel to obtain a signal whenever the frequency of the QRS signal departs from a selected range.

The electronic range detector includes two adjustable resistor bridges energized from sources of DC potential and a comparator. The two bridges are set to different voltages, with one voltage indicating a high-frequency limit and the other voltage indicating a low-frequency frequency limit for the QRS complex signal. A comparator compares the detected QRS signal with each of the DC potentials generated from these bridges and provides an output signal whenever the frequency of the QRS signal is not between the frequency limits.

The output signal from the electronic range detector is delayed in time and then stops the motor so that the magnetic band contains a recording of the electrocardiographic signals that occur just before a frequency limit is exceeded and also the electrocardiographic signals that occur just after a frequency limit is exceeded. The signals that occur in time before a frequency limit is exceeded and those that occur immediately after are the signals of greatest interest. When the motor stops, the audible alarm sounds on the portable tape recorder. The subject then removes a cartridge having the magnetic tape in it and inserts a new cartridge with a new tape to begin recording again.

With this arrangement, it is only necessary to play back short magnetic tapes which have recorded the electrocardiographic signals of greatest interest. Moreover, it is easy to correlate these recordings with the activities of the subject at the time the signals occurred. Because the amount of data to be reviewed is reduced, the playback unit is relatively simple and inexpensive.

The use of frequency modulation of the electrocardiographic signal and the use of a reference timing track on the magnetic tape enables a slow speed to be used for the endless magnetic tape while still providing sufficiently high fidelity. The reference timing signal is used by the playback unit to control the speed of playback and to correct for wow and flutter, which arrangement provides a still further improvement in the fidelity at low cost.

The slow speed at which the tape is driven permits a signal for a sufficient amount of time to be recorded on the tape to cover the period of greatest interest. Moreover, the low speed of the magnetic tape enables a low-torque motor to be used in the portable tape recorder, reducing the cost, size, and weight of the portable recorder and reducing wearing of the recording head.

The above noted and other features of the invention will be better understood from the following detailed description when considered with reference to the accompanying drawings, in which.

GENERAL STRUCTURE

Figure 1:
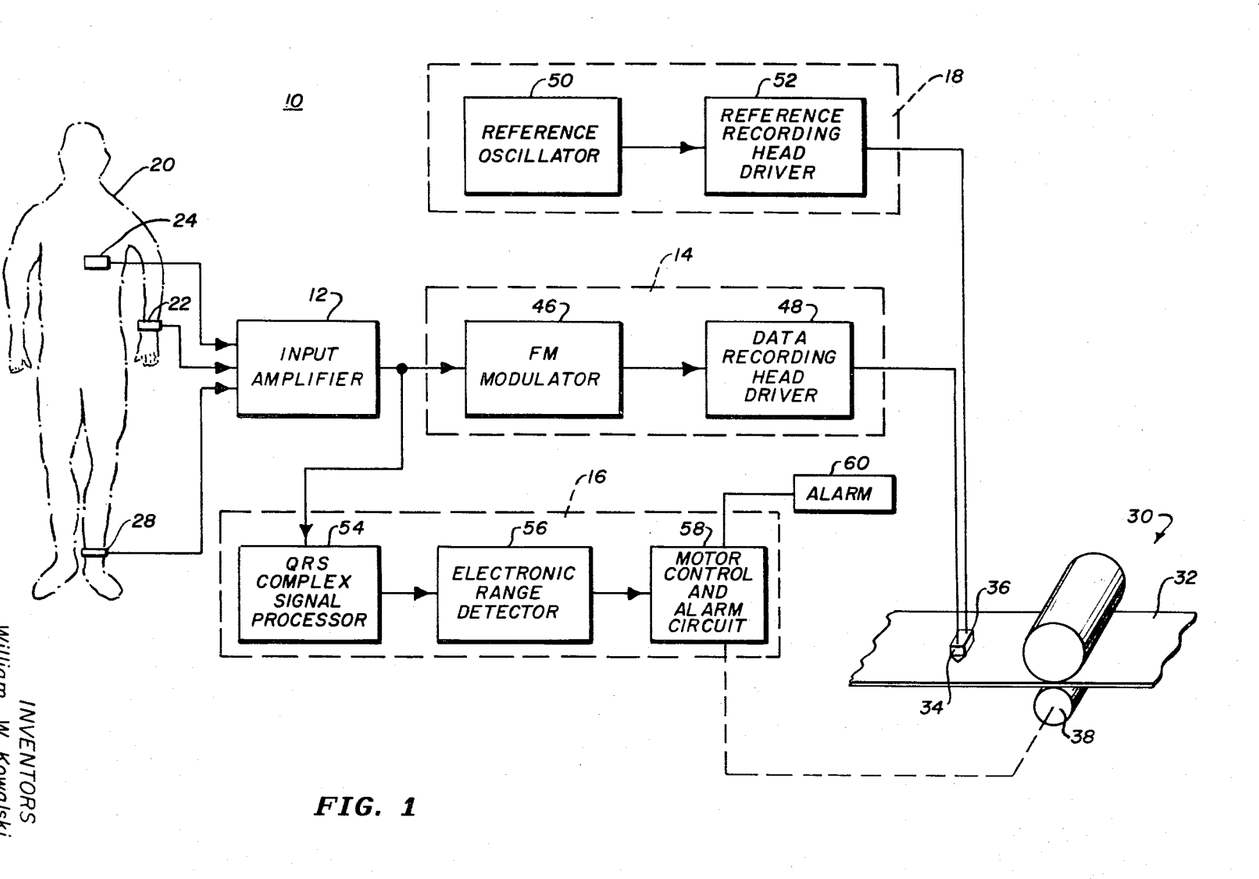
FIG. 1 is a block diagram of a portable recorder which may be used in a preferred embodiment of the invention.

In FIG. 1 a block diagram of a portable tape recorder 10 for recording electrocardiographic signals is shown having an input amplifier 12, a data recording channel 14, a control channel 16, and a reference recording channel 18. To apply the electrocardiographic signal from a subject to the input amplifier 12, three electrodes 22, 24, and 28 are placed on the skin of the subject 20 and electrically connected to the input of the input amplifier 12. The output of the input amplifier 12 is electrically connected to the data recording channel 14 and to the control channel 16. The electrocardiographic signal from the data recording channel 14 and a reference signal from the reference recording channel 18 are both recorded upon a magnetic tape unit 30, which unit is controlled by the control channel 16.

The input amplifier 12 receives the electrocardiographic signal directly from the electrodes 22, 24 and 28 along with a DC noise signal and other high-frequency noise components. It removes the DC noise and the higher frequency noise components, amplifies the electrocardiographic signal and passes this amplified signal without the noise to the data recording channel 14 and to the control channel 16.

The magnetic tape recording unit 30 includes an endless magnetic belt 32, a recording head with a data recording head channel 34, and a reference recording head channel 36. A motor 38 rotates a drive roller to move the endless magnetic belt, which is supported in a cartridge (not shown) upon a single flange spool, past the data recording head channel 34 and the reference signal recording head channel 36.

The data recording channel 14 includes an FM modulator 46 which receives the electrocardiographic signal from the output of the input amplifier 12 and a data recording head driver 48 that has its input electrically connected to the output of the FM modulator 46 and has its output electrically connected to the data recording channel 34.

To provide the reference timing signals that are to be recorded, the reference channel 18 includes a reference oscillator 50 and a reference recording head driver 52. The reference recording head driver 52 receives the oscillations from the output of the reference oscillator 50 and applies them to the reference signal recording head channel 36 within the magnetic tape recording unit 30.

The control channel 16 includes a QRS complex signal processor 54, an electronic range detector 56, and a motor control and alarm circuit 58. The QRS complex signal processor 54 has its input electrically connected to the output of the input amplifier 12 and has its output electrically connected to the input of the electronic range detector 56. The motor control and alarm circuit 58 has its input electrically connected to the output of the electronic range detector 56 and has its output electrically connected to the motor 38 within the magnetic tape unit 30 and to an alarm circuit which controls the audible alarm 60.

Figure 2:
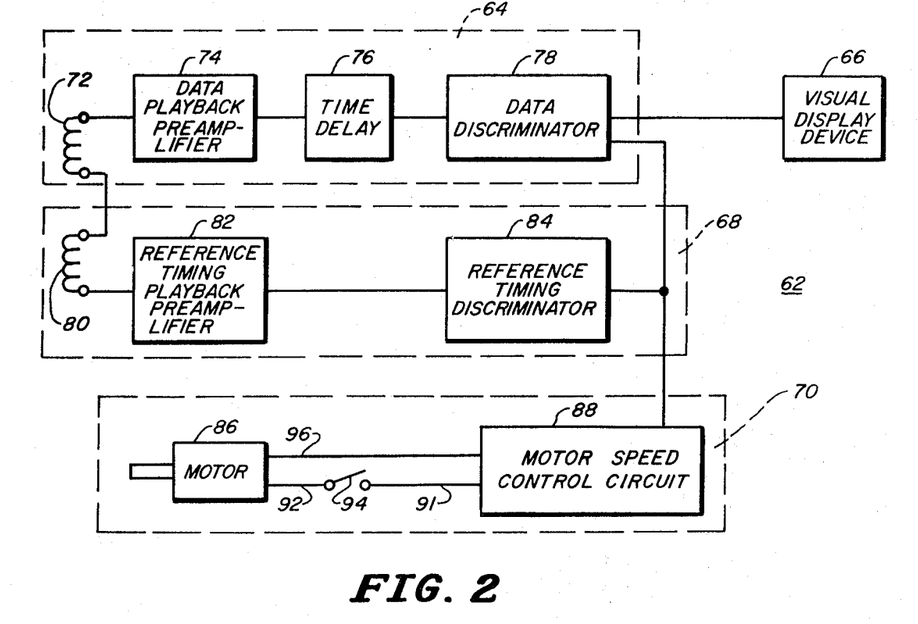
FIG. 2 is a block diagram of a playback unit which may be used in an embodiment of the invention.

In FIG. 2 a block diagram of a playback unit 62 is shown having a data playback channel 64, a visual display device 66 such as an oscilloscope, galvanometer recorder or the like, a reference playback channel 68, and a playback control unit 70.

The data playback channel 64 includes a data read head channel 72, a read head having two channels, a data playback preamplifier 74, a time delay 76, and a data discriminator 78. The data playback preamplifier 74 has its input connected to the read head channel 72 to receive and amplify the FM-modulated signals in the data track on the endless magnetic tape 32 (FIG. 1) and has its output applied to the data discriminator 78 through the time delay 76. The output from the data discriminator 78 is applied to the visual display device 66 of the playback unit 62.

The reference playback channel 68 includes a reference timing signal read head channel 80 of the read head, a reference timing playback preamplifier 82, and a reference timing discriminator 84. The reference timing playback preamplifier 82 has its input electrically connected to the reference read head channel 80 to receive the recorded reference signals from the endless tape 32. Its output terminal is connected to the reference discriminator 84 to pass the amplified recorded reference timing signals thereto. The output of the reference timing discriminator 84 is applied to the data discriminator 78 within the data playback channel 64 and to the playback control unit 70.

The playback control unit 70 includes a DC playback motor 86 for driving the endless magnetic tape 32 (FIG. 1), and a motor speed control circuit 88. The motor speed control circuit 88 receives an input from the reference timing discriminator 84 within the reference channel 68 and applies the proper currents to the DC playback motor 86 to drive the magnetic tape.

GENERAL OPERATION

The portable tape recorder of this invention records electrocardiographic signals from a subject while the subject moves in a normal environment rather than being in an intensive care ward of a hospital. By recording the electrocardiographic signal while the patient is in a normal environment, the heart condition of the patient can be better diagnosed, in some cases from the electrocardiographic signals that are recorded during specific events in the subject's normal life than from electrocardiograms taken while the subject is in an intensive care ward.

To record the electrocardiographic signal from a subject, a normal heart rate for the subject is selected by the physician and set on to the electronic range detector 56 of the recorder. The electrodes 22, 24, and 28 are attached to the subject and the subject carries the recorder around with him with the electrodes 22, 24, and 28 in place. Two of the electrodes 22 and 28 receive signals from an arm and a leg in the illustrated example while the third electrode 24 serves as a ground connection. However, other arrangements are known and any such arrangement may be selected by the physician.

As the subject moves about in normal activities, each of the electrodes 22 and 28 receive electrical potentials. The difference between the potentials received by the electrode 22 and the potential received by the electrode 28 includes the electrocardiographic signal. This signal is referenced to electrode 24 which serves as ground level reference for the system. The electrocardiographic signal received by the input amplifier 12 from the electrodes 22 and 28 is a signal of approximately 1 millivolt together with a 100 millivolts DC noise and other lower amplitude higher frequency noise components. The input amplifier 12 removes the noise and amplifies the electrocardiographic signal, conducting this signal to the FM modulator 46 within the data channel 14 and to the QRS complex signal processor 54 within the control channel 16.

The frequency modulator 46 modulates the electrocardiographic signal into a frequency modulated signal and applies the frequency modulated signal to the data recorder head driver 48 which drives the data recording head channel 34 to record the FM-modulated electrocardiographic signal onto a data track of the endless magnetic tape 32.

To establish a constant time reference during the recording of the electrocardiographic signal on the endless magnetic tape 32, the reference oscillator 50 within the reference channel 18 generates a constant frequency alternating current which is conducted to the reference recording head driver 52 to drive the reference signal recording head channel 36 and to record a constant frequency in the reference track parallel to the data track on the endless magnetic tape 32.

The endless magnetic tape 32 is continually rotated by the motor 38 as the subject pursues his normal activities. As the endless magnetic tape 32 is rotated, the data recording head channel 34 records the electrocardiographic signal and the reference signal recording head channel 36 records a constant frequency to serve as a time base for the electrocardiographic signal. Each point on each of the two parallel tracks bearing the recorded electrocardiographic signal and the reference signal is carried by the endless magnetic tape 32 as the point on the tape moves in its endless path as shown in FIG. 1 from the recording head around a loop and back to the recording head to have a new signal recorded on it.

The endless magnetic tape 32 is rotated at a slow speed such as once every 2 minutes so that the electrocardiographic signal track and the reference signal track have 2 minutes of recorded information on them at any time while the endless magnetic tape 32 is moving. As long as the electrocardiographic signal generated by the subject is within the range set on the electronic range detector 56 by the physician, the motor 38 continues to rotate the endless magnetic tape 32 to record new information onto the tape.

When the patient's electrocardiographic signal exceeds the upper limit or lower limit of the frequency range set in the electronic range detector 56, the endless magnetic tape 32 continues to rotate for a short time such as 1 minute for a motor speed that rotates the magnetic tape 32 once every 2 minutes and then stops. With this time sequence, the endless tape 32 records the electrocardiographic signal and the reference signal for a short time such as 1 minute before and for another short time such as 1 minute after the electrocardiographic signal exceeds the range set upon the electronic range detector 56. Although different lengths of tape may be used, it will be assumed hereinafter for the purpose of explanation that the endless magnetic tape is rotated in 2 minutes and stops 1 minute after the QRS complex signal departs from the range set in the electronic range detector 56.

When the motor 36 stops, the audible alarm 60 emits sound so that subject knows that his electrocardiographic signal has exceeded the range set upon the electronic range detector 56. He is also reminded that he must now change the endless magnetic tape 32 and start the motor 38 again to continue recording his electrocardiographic signal. At this time, the subject may label or mark the tape to indicate what he was doing at the time that the range was exceeded or may only remember it.

To stop the motor 38 when the electrocardiographic signal departs from the range set in the electronic range detector 56, the electrocardiographic signal is applied to the QRS complex signal processor 54 in the control channel 16 from the input amplifier 12. The QRS complex signal processor 54 filters the signal to remove further noise, shapes the electrical pulses that form the QRS complex signal and then converts the pulses to a DC voltage level that represents the frequency of the pulses in the QRS complex signal by its amplitude. This DC voltage level is applied to the electronic range detector 56 where it is compared with DC voltage reference levels representing the upper and lower frequency ranges set by the physician. When these ranges are exceeded a signal is sent by the electronic range detector 56 to the motor control and alarm circuit 58.

When the motor control and alarm circuit 58 receives a signal from the electronic range detector 56 indicating that the electrocardiographic signal has departed from the range set upon the electronic range detector 56, the motor control and alarm circuit 58 delays the signal for 1 minute and then stops the motor 38 and provides a signal to the audible alarm 60. The motor remains off until the motor control circuit is reset.

The control circuit 16 includes a manual switch that also causes a signal to be applied to the motor control and alarm circuit 58 similar to the signal that is applied by the electronic range detector 56 when the electrocardiographic signal departs from the range set on the electronic range detector 56. The subject depresses this button when he feels discomfort or pain even though the electrocardiographic signal is within the set range. This enables the endless magnetic tape 32 to record the electrocardiographic signal from the subject during at least a portion of the time that he suffers the discomfort.

The endless magnetic tapes 32 that the subject removes from the recording unit 30 are played back on the playback circuit shown in FIG. 2 so that they may be observed by a physician on the visual display device 66. As the endless magnetic tapes 32 are played back, the electrocardiographic signal is received by the playback data head channel 72 of the playback head and applied to the data playback preamplifier 74 for amplification. After being amplified, the signal passes through the time delay 76 and through the data discriminator 78, which demodulates the signal and applies the demodulated electrocardiographic signal to the visual display device 66 for viewing.

To control the speed of the motor 86 which drives the endless magnetic tape 38 during playback, the reference timing signal is received by the playback reference timing signal reading head channel 80 of the playback head and applied to the reference timing playback preamplifier 82 for amplification. The reference timing signals are recorded on endless magnetic tape 32 at a frequency of 1,700 hertz by the reference channel 18 of the portable tape recorder 10 (FIG. 1) and, if the motor 85 is playing the tape back at the same speed that it was moving during recording, the reference discriminator 84 receives the reference signal at the frequency of 1,700 hertz and does not generate an output signal. However, if the endless magnetic tape 32 runs at a different speed during playback than it did during recording, the reference discriminator 84 receives the reference signal at some frequency other than 1,700 hertz. The reference discriminator 84 provides an output signal indicating the direction in which the reference frequency deviates from 1,700 hertz by supplying a positive-going voltage to its output terminal when the frequency is higher than 1,700 hertz and negative-going voltage when the frequency is lower than 1,700 hertz.

The output from the reference discriminator 84 controls the frequency of the electrocardiographic signal that is conducted to the visual display device 66 in two ways, which are: (1) it controls the speed of the motor 86 so that the motor drives the endless tape 32 at a rate which causes the reference signal applied to the reference discriminator 84 to be 1,700 hertz, and (2) it corrects for wow and flutter within the data playback channel 64.

To control the speed of the motor 86, the output from the reference discriminator 84 is applied to the motor speed control circuit 88. The motor speed control circuit applies current to the motor 86 through a circuit that includes the following elements in series in the order named which are: (1) the motor speed control circuit 88; (2) the conductor 91; (3) the switch 94; (4) the conductor 92; (5) the motor 86; (6) the conductor 96; and (7) the motor speed control circuit 88.

The motor speed control circuit 88 includes an operational amplifier (not shown) serving as an adding circuit to provide current to the field winding of the motor 86 through the conductors 92 and 96. When the frequency applied to the reference discriminator 84 is above 1,700 hertz, an output signal supplied by the reference discriminator 84 is subtracted from the field current through the conductors 92 and 96 causing the motor to slow down. Similarly, when the speed of the motor 86 falls below 1,700 hertz, the signal from the reference discriminator 84 is added to the current flowing through the conductors 92 and 96 to cause the motor 86 to increase in speed. With this mechanization, the speed of the motor 86 is maintained constant so that the reference timing signal read by the reference timing read head 80 is at 1,700 hertz.

Wow and flutter are caused by instantaneous changes in the speed of the tape. There is a tendency for instantaneous changes to occur because the endless magnetic tape 32, in the preferred embodiment, is contained in a cartridge for ease of insertion and removal by the subject. Varying amounts of tension are applied onto the tape by the cartridge as it is driven causing wow and flutter, which must be removed within the playback data channel 64. Similarly, mechanical anomalies in the drive system cause wow and flutter.

To correct for wow and flutter, the output from the reference discriminator 84 is applied to the data discriminator 78. The data discriminator 78 includes a delay one-shot multivibrator that receives the pulses of the electrocardiographic signal and provide a shaped output pulse for each pulse received. The output signal from the reference timing discriminator is applied to this one-shot multivibrator to alter its time of triggering. With this electrical connection, the output from the reference discriminator 84 changes the time of occurrence of the pulses within the electrocardiographic signal by changing the amount of delay within the data discriminator 78.

To enable the reference frequency to instantaneously correct the electrocardiographic signal occurring from wow and flutter within the endless magnetic tape 32, the correcting signal from the output of the reference discriminator 84 generated by a reference timing signal must be applied to the data discriminator 78 at the exact time that the electrocardiographic signal that was recorded next to the reference timing signal is applied to the delay multivibrator within the data discriminator 78. For this purpose, a time delay 76 is incorporated within the playback data channel 64 and adjusted so that the electrocardiographic signal is applied to the delay multivibrator at the same time that the reference discriminator 84 applies an output signal generated by the reference timing signal adjacent to the electrocardiographic signal to correct the electrocardiographic signal.

As explained hereinafter with reference to FIG. 3, a marking voltage is generated and recorded when the QRS complex signal deviates from the set range and this marking voltage appears as an offset on the visual display to separate the electrocardiographic signals that occur before this time from those that occur after this time.

Because an endless magnetic tape 32 is utilized which only records 2 minutes of signal at a critical time, the playback of the signal does not require as long an amount of time as a continuous reel of tape. Moreover, it is not necessary to scan the tape to locate the portions of interest before displaying the signal because the bands contain few signals that are not of interest. This enables the playback circuitry to be economical and the users of the system to save time when playing back the recorded electrocardiographic signals.

The portable recorder aids in diagnosis because an alarm is given each time the frequency of the electrocardiographic signal departs from the selected range. The subject then removes the endless magnetic tape and can make a note of what he was doing at the time the alarm sounded. With this process, the electrocardiographic signal from a tape cartridge can be viewed at the same time the diagnostician has before him an explanation of what the patent was doing. Because this explanation may account for the change in the frequency of the electrocardiographic signal, it aids the diagnostician.

TAPE RECORDER INPUT AMPLIFIER

Figure 3:
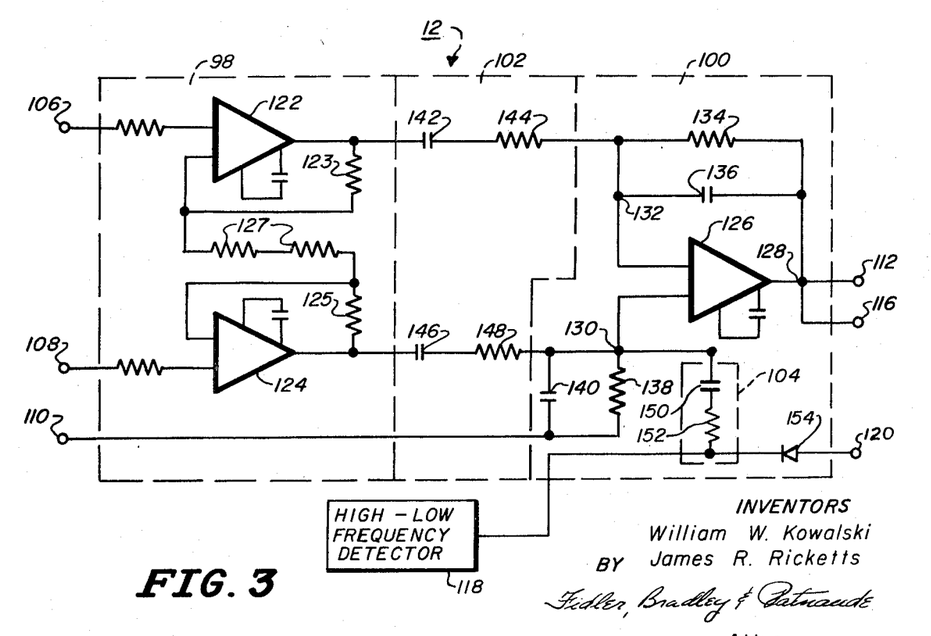
FIG. 3 is a schematic circuit diagram of an input amplifier used in the portable tape recorder of FIG. 1.

In FIG. 3, the input amplifier 12 for the portable tape recorder 10 is shown having a first amplification stage 98, a second amplification stage 100, a coupling network 102 between the first and second amplification stages, and a trigger indicating pulse generator 104. There are three input terminals 106, 108, and 110 connected to the first amplification stage 98 and two output terminals 112 and 116 leading from the second amplification stage 100. The trigger indicating pulse generator 104 is connected between the second amplification stage 100 and a high-low frequency detector 118 shown in detail in FIG. 7. It includes an output terminal 120 for providing a trigger indicating output pulse.

The first amplification stage 98 includes two operational amplifiers 122 and 124 with the input terminal 106 being connected through a 10K resistor to the positive terminal of the amplifier 122 and the input terminal 108 being connected through another 10K resistor to the negative input terminal of the operational amplifier 124. The operational amplifiers have a high input impedance to better match the impedance of the subject. Each of the two operational amplifiers 122 and 124 includes a different one of the 50K resistors 123 and 125 in its feedback loop to provide a gain of 5. The low gain of the first amplification stage is necessary because the input signal includes a small electrocardiographic signal of approximately 1 millivolt and a DC noise signal of approximately 100 millivolts. If a large gain were to be used in the first amplification stage, the signal might be clipped as the amplifiers saturate.

To cancel noise, such as 60 hertz noise, two 5K resistor 127 are connected in series between the negative input terminal of the operational amplifier 122 and the positive terminal of the operational amplifier 124 in the first amplification stage. This arrangement is primarily intended to cancel 60 hertz noise but cancels any noise which appears in phase at both terminal 106 and 108.

The second amplification stage 100 of the input amplifier 12 includes still another operational amplifier 126 having an output terminal 128, a positive input terminal 130 and a negative input terminal 132. The output terminal 128 of the operational amplifier 126 is electrically connected to each of the following: (1) the output terminal 112 of the input amplifier 12; (2) the output terminal 116 of the input amplifier 12; and (3) the negative input terminal 132 of the amplifier 126 through a circuit having a 1.0M resistor 134 in parallel with a 750 picofarad capacitor 136. The resistor 134 and the capacitor 136 rolloff frequencies above 230 hertz to establish the high cutoff frequency of 230 hertz for the input amplifier. For the same reason, the input terminal 110 of the input amplifier 12 is connected to the positive input terminal of the operational amplifier 126 through the parallel resistor 138 and capacitor 140 which have the same values as the resistor 134 and the capacitor 136 respectively. The amplifier 126 is a high gain amplifier.

To couple the first amplification stage 98 to the second amplification stage 100, the coupling stage 102 includes: (1) a first series connected 360 microfarad capacitor 142 and 10K resistor 144 between the output of the operational amplifier 122 in the first amplification stage 98 and the input terminal 132 of the operational amplifier 126 and (2) a second series connected 360 microfarad capacitor 146 and 10K resistor 148 connected between the output of the operational amplifier 124 within the input amplification stage 98 and the input terminal 130 of the operational amplifier 126 in the second amplification stage. The capacitors 142 and 146 block the DC component from the input terminals of the operational amplifier 126.

The trigger indicating pulse generator 104 includes a series connected 0.1 microfarad capacitor 150 and 6.8M resistor 152 forming a RC circuit that is connected at one end to the positive input terminal 130 of the operational amplifier 126 and at its other end to both the high-low frequency detector 118 and the cathode of a diode 154, the anode of which is electrically connected to the output terminal 120.

The trigger indicating pulse generator 104 provides a current pulse at terminal 120 to indicate that the electrocardiographic signal has departed from the proper frequency range. To provide this current signal, the high-low frequency detector 118, which will be described hereinafter, shifts from a positive voltage output to a ground level output to indicate that the electrocardiographic signal has departed from the range set on the electronic range detector 56 (FIG. 1).

When the high-low frequency detector 118 grounds the cathode of the diode 154, the capacitor 150 is discharged to lower the voltage to the positive input terminal 130 of the amplifier 126. The negative-going voltage on input terminal 130 causes the input amplifier 12 to provide a signal to the data recording head driver 34 which records a signal to indicate that the high-low frequency detector 118 has been triggered because the frequency of the electrocardiographic signal has departed from the selected range. The capacitor 150 is then charged by a negative current flow flowing into the terminal 120 from a negative source and from the output of the amplifier 124 until it is charged sufficiently to have a potential equal to the potential applied to the terminal 130 by the amplifier 124. The trigger pulse is terminated at this time and the recording again continues at its normal amplitude.

The input amplifier 12 has a standard gain of a 1,000 so that an input potential that varies in amplitude by one-tenth of a millivolt at the input to the input amplifier 12 causes a swing of approximately one-tenth of a volt at the output terminal. The output terminals 116 and 112 of the input amplifier 12 provide the amplified electrocardiographic signal to the FM modulator 46 and to the QRS complex signal processor 54. The input amplifier 12 has a frequency response of between 0.046 to 230 hertz.

The grain of the first stage is changed in a conventional manner, when desired, by changing the value of resistors in the circuit. For example, in one embodiment a reduction in the gain to one-half standard (500) is made by doubling the value of the resistors between the electrodes and the inputs to the amplifiers 122 and 124. This is accomplished by a high resistance in the input cables. In another embodiment other resistors are connected into the amplifiers by a switch to accomplish the reduction in gain.

In operation, the two terminals 106 and 108 receive an electrocardiographic signal from the electrodes 22 and 28 that are positioned on the skin of the patient. The terminal 110 receives a potential from the electrode 24 on the skin of the patient, which potential serves as a ground potential for the circuitry in the portable tape recorder.

The signals from terminals 106 and 108 are each applied to a terminal of opposite polarity in the operational amplifiers 122 and 124. The difference between these two potentials is the electrocardiographic signal and it appears across the resistor network that connects the output terminals of the amplifiers 122 and 124 together. With this arrangement, noise such as 60 hertz noise is cancelled in the output circuit of the first amplification stage 98.

To remove the DC component, the first amplification stage 98 is connected to the second amplification stage 100 through a coupling network 102 that includes the series capacitors 142 and 146. With this arrangement only the varying electrocardiographic signal is applied from the output terminals of the amplifiers 122 and 124 to the input terminals 130 and 132 of the operational amplifier 126 within the second amplification stage 100. These signals also include some higher frequency noise, which is rolled off by two RC circuits one of which includes the resistor 134 and capacitor 136 and the other of which includes the resistor 138 and capacitor 140.

To mark the point on the recording that the frequency of the electrocardiographic signal has exceeded the range set on the electronic range detector 56 (FIG. 1), a trigger indicating pulse generator 104 is provided between the high-low frequency detector 118 at the output of the electrical range detector 56 and one of the input terminals 130 to the amplifier 126 in the second amplification stage 100 of the input amplifier 12.

When the electronic range detector indicates that the electrocardiographic signal has departed from the selected range, the high-low frequency range detector 118 causes a signal to be applied to the input terminal 130 of the amplifier 126 through an RC circuit including the capacitor 150 and the resistor 152. This causes a signal to be recorded on the magnetic tape 32 which lasts for the period of time controlled by the time constant of the RC circuit in the trigger indicating pulse generator 104. This indication on the recording is located on the endless band 32 so that there is, in one embodiment, approximately 1 minute of electrocardiographic signal on one side of the indication containing electrocardiographic signals occurring immediately preceding the time the frequency departed from the set range and 1 minute of recording on the other side of the indication containing electrocardiographic signals occurring immediately after the time the frequency departed from the set range.

FM MODULATOR, REFERENCE OSCILLATOR, AND HEAD DRIVERS

Figure 4:
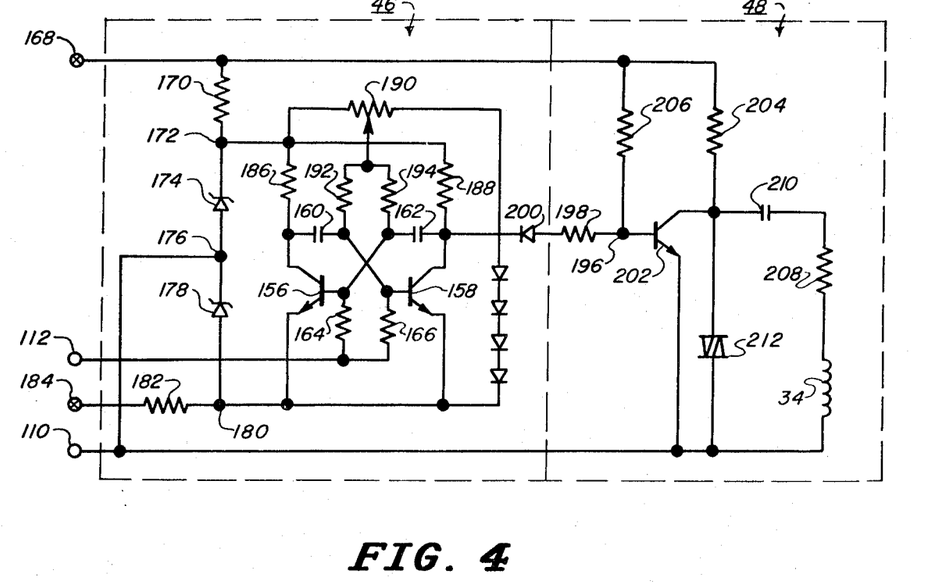
FIG. 4 is a schematic circuit diagram of a frequency modulator and data recording head driver for the portable tape recorder of FIG. 1.

In FIG. 4 a schematic circuit diagram is shown of the FM modulator 46 and the data recording head driver 48. The reference oscillator 50 and the reference recording head driver 52 are similar to the FM modulator 46 and data recording head driver 34 and will be discussed with reference to the FM modulator 46 and data recording head driver 34.

The FM modulator includes two 2N4286 NPN-transistors 156 and 158 with capacitor crossover circuits 160 and 162 interconnecting the collector of each of the transistors to the base of the other transistor to form a free running multivibrator. The output signal on output terminal 112 of the input amplifier 12 is applied to the base of each of the transistors 156 and 158 through a different one of the 76.8K resistors 164 and 166 to modulate the frequency of the free running multivibrator.

Figure 7:
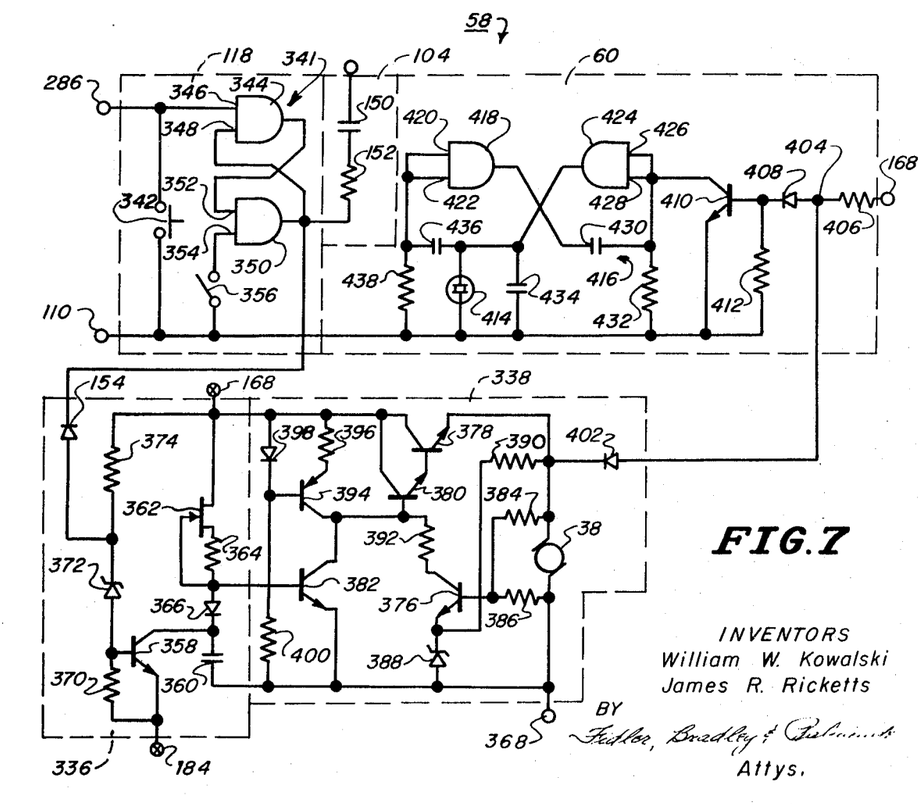
FIG. 7 is a schematic circuit diagram of the motor control and alarm circuit which may be used in the tape recorder of FIG. 1.

To apply a constant 7.8 volt collector potential to the two transistors 156 and 158, a series circuit is provided that includes the following components in the order named: (1) the positive terminal of a 5.4 volt battery 168; (2) an 820 ohm resistor 170; (3) the collector supply output terminal 172; (4) a first zener diode 174 having its cathode electrically connected to the terminal 172; (5) a ground terminal 176 connected to the anode of the zener diode 174; (6) a second zener diode 178 having its cathode connected to the terminal 176; (7) a terminal 180 electrically connected to the emitters of both transistors 156 and 158; (8) a second 820 ohm resistor 182; and (9) the negative terminal 184 of a 5.4 volt battery. The 22K ohm collector resistors 186 of the transistor 156 and 188 of the transistor 158 are connected at one end to the terminal 172 and at the other end to the collectors of their respective transistors. The positive terminal 168 and the negative terminal 184 are terminals of two different batteries, connected in series with the connection between the two batteries serving as a DC return 368 (FIG. 7).

The constant voltage control circuit utilizing the zener diodes 174 and 178 permits the batteries to decay in potential from 5.6 to 4.4 volts without impairing the operation of the FM modulator. This amount of decay of the batteries, which in the preferred embodiment are mercury cell batteries, occurs after approximately 16 hours of use.

The central frequency of the FM modulator 46 is adjusted by moving the tap of a potentiometer 190, which tap is connected to the base of each of the transistors 156 and 158 through a different 453K resistor 192 and 194. The frequency of the FM modulator 46 is set at the factory and this pot is sealed. It has a 30 percent frequency range.

To provide temperature compensation to the FM modulator 46, the potentiometer 190 is electrically connected at one end to the terminal 172 and is connected at its other end to the anode of a first four series connected 1N4148 temperature compensation diodes, the last of the four diodes having its cathode connected to the terminal 180. These four diodes correct the collector voltage as the temperature changes to hold the central frequency with less than 1 percent drift.

The FM modulator 46 is modulated by the output voltage from the input amplifier 12 on terminal 112. It has a central frequency of 960 hertz with a deviation or sensitivity of 200 hertz per volt. For example, if there is a 1 volt input on terminal 112, the FM modulator 46 provides an output to the data recording head driver 48 of 1,160 hertz.

The input terminal 196 of the data recording head driver 48 is connected to the collector of the transistor 158 through a 10K resistor 198 and a diode 200 having its cathode connected to the collector of the transistor 158. A 2N4286 NPN-transistor 202 has its base connected to the input terminal 196, its collector connected to the positive terminal 168 of the 5.4 volt source through a 4.7K resistor 204 and its emitter grounded to the terminal 110. A 15K resistor 206 is connected between the positive terminal 168 of the 5.4 volt source and the base of the transistor 202.

The data recording head 34 has one end of its winding electrically connected to the emitter of the transistor 202 and its other end connected to the collector of the transistor 202 through a 220 ohm resistor 208 in series with a 10 microfarad capacitor 210. The output voltage is clipped by two 1N4148 double diodes 212 connected across the emitter and collector of the transistor 202.

The reference recording head driver 52 is the same in construction as the data recording head driver 48 and the reference oscillator 50 is similar to the FM modulator 46. The reference oscillator 50 is also a free running multivibrator using the same components with the same parameters as the free running multivibrator within the FM modulator 46, but does not include resistors such as 164 and 168 that connect the bases of the two transistors in the FM modulator 46 to a source of modulating potential on terminal 112. Moreover, there is no potentiometer to adjust the center frequency and fewer diodes in the temperature compensation circuit.

QRS COMPLEX SIGNAL PROCESSOR

Figure 5:
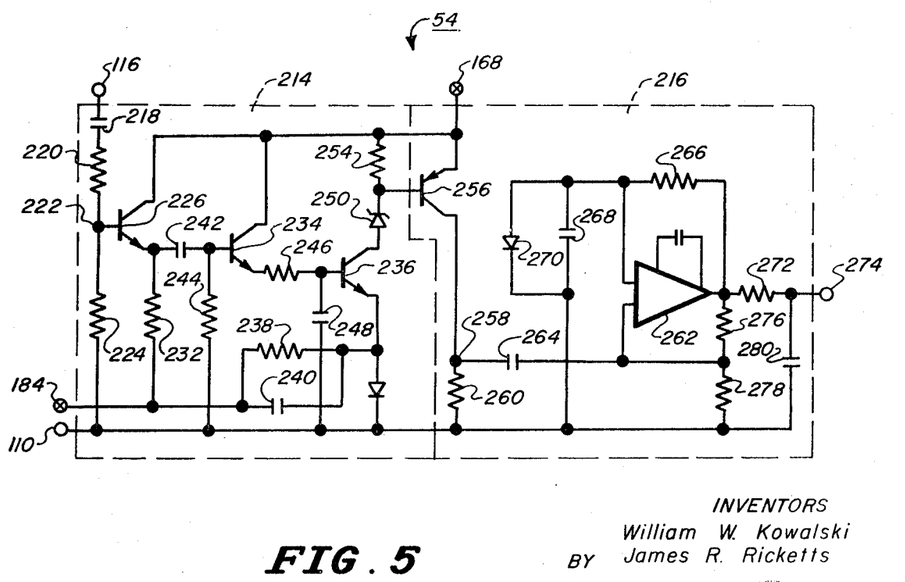
FIG. 5 is a schematic circuit diagram of a QRS signal processing unit used in the tape recorder of FIG. 1.

In FIG. 5, a schematic circuit diagram of the QRS signal processor 54 is shown having an active time domain filter 214 and a frequency detector 216. The time domain filter 214 receives the electrocardiographic signal from the input amplifier 12 and removes unwanted noise within the electrocardiographic signal to leave only the QRS signal. The QRS signal is detected by the detector 216 to result in a DC voltage having an amplitude that is proportional to the frequency of QRS complex signal.

To couple the time domain filter 214 to the output of the input filter 12, the terminal 116 is connected to ground at the terminal 110 through the following elements in series in the order named: (1) a 0.47 microfarad capacitor 218; (2) a 1K resistor 220; (3) input terminal 222, and (4) a 51K resistor 224. To match the impedance of the time domain filter 214 to that of the input amplifier 12, a 2N613 transistor 226 is connected in an emitter follower configuration, having its base electrically connected to the input terminal 222 to receive the positive pulses from the input amplifier 12. The collector of the transistor 226 is electrically connected to the positive terminal 168 of a 5.4 volt source and the emitter is electrically connected to the negative terminal 184 of a 5.4 volt source through a 3.9K resistor 232.

To provide time domain filtering, the time domain filter 214 includes an angle sensitive trigger having a first 2N4286 transistor 234, a second 2N4286 transistor 236, and an RC circuit having a 430K resistor 238 connected in parallel with a 10 microfarad capacitor 240. The NPN-transistor 234 has its collector connected to the positive terminal 168 of the 5.4 volt source and has its base connected both to the emitter of the transistor 226 through a 0.47 microfarad coupling capacitor 242 and to ground through a 51K biasing resistor 244. The emitter of the transistor 234 is connected to the base of the transistor 236 through a 510K resistor 246 with the base of the transistor 236 being connected to ground through a 0.1 microfarad capacitor 248.

The collector of the NPN-transistor 236 is connected to the terminal 168 of the positive 5.4 volts through the following components in series in the order named, which are: (1) a 1N752A zener diode 250 having its anode connected to the collector of the transistor 236; (2) an output terminal 252; and (3) a 27K resistor 254. The emitter of the transistor 236 is connected to the negative terminal 184 of a 5.4 volt source through the RC circuit that includes the resistor 238 and the capacitor 240 and is connected to ground through a diode 241 that has its anode connected to the emitter.

In operation, the electrocardiographic signal from the input amplifier 12 drives the emitter follower 226 causing positive pulses to be applied in phase to the base of the transistor 234 which causes the transistor 236 to conduct. As the transistor 236 conducts, the capacitor 240 of the RC circuit is charged until it provides a positive potential to the transistor 236 that is of high enough amplitude to cut if off. The transistor 236 then becomes nonconducting until sufficient charge has been bled from the capacitor 240 through the resistor 238 to permit the transistor 236 to be turned on by the next current pulse from the transistor 234. In this manner, QRS complex pulses which have a frequency between 4 and 10.5 hertz are passed through the filter whereas other signals are blocked. For example one type of signal called T-wave occurs at a frequency of approximately 3 hertz and another signal called a P-wave at a frequency of approximately 3½ hertz. Both of these signals are blocked because the potential on the capacitor 240 holds the transistor 236 in its nonconducting state when these signals are applied.

In detecting the QRS complex signals, the pulses comprising these signals are first shaped by a pulse shaping circuit within the detector 216. This pulse shaping circuit includes the 2N4288, PNP-transistor 256 which has its base connected to the output terminal 252 of the time domain filter 214, has its emitter electrically connected to the positive terminal 168 of the 5.4 voltage battery and has its collector connected in series to the following: (1) a terminal 258; (2) a 27K resistor 260; and (3) ground 110.

The pulse shaper also includes a one-shot multivibrator formed from the operational amplifier 262, one input terminal of which is connected to the terminal 258 through a 0.47 microfarad capacitor 264. The feedback loop from the output of the operational amplifier 262 to the other of its input terminals includes a 680K resistor 266. This other input terminal to the operational amplifier 262 is connected to the ground through a 1 microfarad capacitor 268, which capacitor is shunted by a diode 270 having its anode connected to the other input terminal of the operational amplifier 262. This operational amplifier with the feedback loop is the one-shot multivibrator. It provides an output that has one negative going pulse of 128 millisecond time duration falling between a positive 5 volts to a negative 4 volts for each pulse of the QRS complex signal.

The output from the amplifier 262 is connected to a bridge circuit for converting the square wave output into a DC level. This bridge includes a 22K resistor 272 connected between the output of the operational amplifier 262 and the output terminal 274 of the QRS complex signal processor, a 10K resistor 276 connected between the output of the operational amplifier 262 and its first input terminal, a 1K resistor 278 connected between the first input terminal of the operational amplifier 262 and ground and a 360 microfarad capacitor 280 connected across the output terminal 274 on the QRS complex signal processor 54 and ground. A positive voltage is provided at terminal 274 that decreases in amplitude as the frequency of the QRS complex signal increases.

ELECTRONIC RANGE DETECTOR

Figure 6:
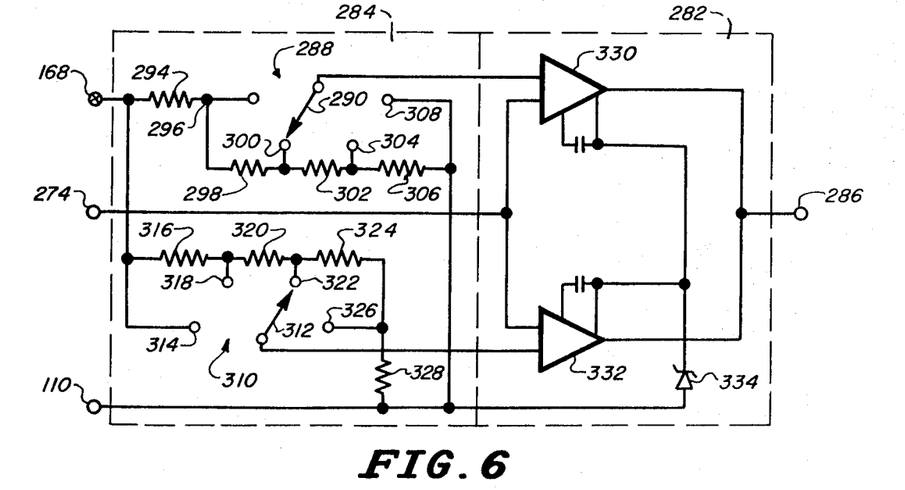
FIG. 6 is a schematic circuit diagram of the electronic range detector used in the tape recorder of FIG. 1.

In FIG. 6, a schematic circuit diagram of the electronic range detector 56 is shown having a voltage comparator 282 and a range setting circuit 284. The range setting circuit 284 is connected to the voltage comparator 282 and provides an adjustable low DC voltage and adjustable high DC voltage to the comparator, which voltages represent the upper frequency limit and the lower frequency limit respectively of the range of frequencies of the QRS complex signal which range of signals does not stop the motor 38 driving the endless magnetic tape 32. The terminal 274 which receives the DC voltage representing the frequency of the QRS complex signal is also electrically connected to the comparator 282. The voltage comparator 282 is connected to the output terminal 286 which provides an indication whenever the voltage applied to the input terminal 274 exceeds the adjustable higher DC voltage or falls below the adjustable lower DC voltage applied to the comparator 282 by the range switch 284.

To provide a voltage to the comparator 282, which voltage represents the upper frequency limit set into the electronic range detector 56, a first resistor bridge 288, a movable switch arm 290 cooperating therewith, and an electrical connection 292 to the positive terminal 168 of the 5.4 volt battery are provided. The resistor bridge 288 includes the following components in series in the order named, which are: (1) a 21K resistor 294 connected at its first end to the positive terminal 168 of a 5.4 volt battery; (2) a first electrical contact 296 connected to the second end of the resistor 294; (3) a 4.99K resistor 298; (4) another electrical contact 300; (5) a 4.75K resistor 302; (6) another electrical contact 304; (7) a 18.2K resistor 306; and (8) another electrical contact 308, the electrical contact 308 being grounded to the terminal 110. The electrical contacts 296, 300, 304 and 308 are arranged to make with the switch arm 290.

To provide a voltage representing the lower frequency limit of the range set into the electronic range detector 56, a second resistor bridge 310 and a second movable switch arm 312 are provided. The second resistor bridge 310 includes the following components electrically connected in series in the order named, which are: (1) an electrical contact 314, which electrical contact is connected to the source 168 of a positive 5.4 volts; (2) an 11.8K resistor 316; (3) another electrical contact 318; (4) a 1.82K resistor 320; (5) an electrical contact 322; (6) a 1.82K resistor 324; (7) an electrical contact 326; (8) a 32.4K resistor 328 which is electrically connected at its far end to the ground terminal 110. The electrical contacts 314, 318, 322 and 326 are arranged to make with the switch arm 312.

To compare the voltage representing the upper frequency limit with the input voltage on terminal 274, a first operational amplifier 330 is provided within the comparator 282 having its negative input terminal connected to the switch arm 290 and its positive input terminal electrically connected to the terminal 274.

To compare the voltage provided by the second resistor bridge 310 and representing the lower frequency limit with the input voltage on terminal 274, a second operational amplifier 332 is provided having its negative terminal electrically connected to the input terminal 274 and having its positive terminal electrically connected to the switch arm 312. The output of the operational amplifiers 330 and 332 are connected to the output terminal 286 of the electronic range detector 56.

In operation, the physician sets the frequency range on the portable tape recorder 10 before the subject begins carrying it. To set the upper frequency limit, the physician turns a dial that moves the movable switch arm 290 from one of the contacts 296, 300, 304 and 308 to another contact. If the physician leaves the switch arm 300 in contact with the first contact 296, the upper frequency limit is 90 pulses per minute. Similarly, if the switch arm 290 is positioned on the second or third contacts 300 and 304 the upper frequency limit is 120 pulses per minute or 150 pulses per minute. If the switch arm is grounded to the contact 308, operational amplifier 330 is disabled from providing a trigger voltage to the output terminal 286 inasmuch as the input signal can never achieve a low enough amplitude to compensate for the ground level potential applied to the negative terminal of the operational amplifier 330.

To set the lower frequency limit, the physician moves a dial that adjusts the switch arm 312 to one of the electrical contacts 314, 318, 322, or 326. If the switch arm 312 is positioned on the contact 314, which is directly connected to the positive terminal 168 of a 5.4 voltage source, the operational amplifier 332 is disabled from providing a trigger signal. When the switch arm 312 is connected to the contacts 318, 322, or 326, a lower frequency limit of 40, 50 or 60 pulses per minute respectively is set.

The QRS complex signal processor 54 applies a signal to the terminal 274 that is positive but decreases in amplitude as the frequency of the QRS complex signal increases. The amplitude decreases because the negative going pulses from the monostable multivibrator formed from the amplifier 262 decreases the positive potential applied through the filter at the output of the QRS complex signal processor 54 in proportion to the number of negative-going pulses. The proportion of negative-going pulses increases as the frequency of the QRS complex signal applied to the QRS signal processor 54 increases.

As long as the positive potential applied to the input terminal 274 is greater than the positive potential applied to the switch arm 290, the operational amplifier 330 provides a positive output signal to the output terminal 286 of the electronic range detector 56. However, when the positive input potential to the terminal 274 becomes lower in amplitude than the positive potential applied to the switch arm 290, the operational amplifier 330 does not provide a positive output signal because the input potential to its negative terminal is greater than the input to its positive terminal. Similarly, as long as the positive potential applied to the input terminal 274 of the electronic range detector 56 is lower in amplitude than the potential applied to switch arm 312, the operational amplifier 332 provides a positive output voltage. However, when the voltage applied to terminal 274 increases in amplitude to a value greater than that applied to the switch arm 312, the operational amplifier 332 does not provide a positive output voltage because the amplitude of the input voltage to its negative input terminal is greater than that to its positive input terminal.

The output voltages of the operational amplifiers 330 and 332 cannot fall below ground level. The feedback loops on these operational amplifiers are each connected at the output end of the amplifier to the cathode of the 1N748A zener diode 334, the anode of which is grounded. This zener diode clamps the output to ground against negative going output voltages.

MOTOR CONTROL AND ALARM CIRCUIT

In FIG. 7 a schematic circuit diagram of the motor control and alarm circuit 58 is shown having a high-low frequency detector 118 and a trigger indicating pulse generator 104 (both indicated generally in FIG. 3) a time delay circuit 336, a motor current control circuit 338, and an alarm circuit 60. The high-low frequency detector 118 receives a signal from the output of the electronic range detector 56 on terminal 286 and, in response, generates a pulse that is applied to the trigger indicating pulse generator 104 and to the time delay circuit 336. In response, the trigger indicating pulse generator 104 applies a signal to the input amplifier 12 to be recorded on the endless magnetic tape 32 and the time delay circuit 336 delays the trigger for 1 minute before conducting it to the motor current control circuit 338. Upon receiving the trigger signal, the motor current control circuit 338 shuts off the current flow to the motor and triggers the alarm 60.

To generate the trigger pulse, the high-low frequency detector 118 includes a flip-flop 341 and a manual pushbutton switch 342. The manual pushbutton switch 342 is connected between the input terminal 286 and ground 110 so that, when closed, a ground signal is applied to the terminal 286 even though the electronic range detector 56 is not indicating that the frequency range has been exceeded.

This pushbutton is often sued when the switch arms 290 and 312 within the electronic range detector are positioned on the contacts 308 and 318 respectively so that the electronic range detector 56 is operating in the manual mode of operation and cannot provide a ground level trigger signal to the terminal 286. When the tape recorder is operating in this manner, the pushbutton 342 is the sole mechanism for generating a trigger signal.

Of course, this pushbutton can also be used when the electronic range detector is not set for manual operation in the event that the subject wishes to stop the magnetic belt 32 even though his QRS complex signal has not departed from the range set on the electronic range detector 56.

The flip-flop 341 includes a first inverting AND-gate 344 having a first input terminal 346 and second input terminal 348 and a second inverting AND-gate 350 having a first input terminal 352 and a second input terminal 354. The AND-gates 344 and 350 provide a ground level output signal upon receiving a positive 3 volt signal on all of their input terminals and provide a positive 3 volt output signal upon receiving a ground level signal on any of their input terminals.

The input terminal 286 for the motor control and alarm circuit 58 is electrically connected to the input terminal 346 of the AND-gate 344 and the output terminal of the AND-gate 350 is electrically connected to the input terminal 348 of the AND-gate 344. The output terminal of the AND-gate 344 is electrically connected to the input terminal 352 and the ground level terminal 110 is electrically connected to the input terminal 354 of the AND-gate 350 through a switch 356 that is open only when the cartridge containing the endless magnetic tape 32 is in place within the portable tape recorder. While the switch 356 is open, the AND-gate 350 operates as an inverter since it has only one active input terminal.

The output from the AND-gate 350 is electrically connected to the resistor 152 within the trigger indicating pulse generator 104 and also to the cathode of the diode 154 within the time delay circuit 336.

When a ground level signal is applied to the terminal 286 by the electronic range detector 56 or by closing the pushbutton switch 342, the AND-gate 344 in the flip-flop 341 provides a positive 3 volt output pulse to the input terminal 352 of the AND-gate 350. The AND-gate 350 then applies a ground level output pulse to three units, which are (1) the input terminal 348 of the AND-gate 344 to lock the flip-flop in its closed state; (2) the trigger indicating pulse generator 104; and (3) the time delay circuit 336. The flip-flop remains in this set condition until the cartridge containing the endless magnetic tape 32 is removed, in which case the switch 356 is closed, applying a ground level signal to the input 354 of the AND-gate 350. Upon receiving the ground level signal on its input terminal, the AND-gate 350 applies a positive 3 volts to the input terminal 348 of the AND-gate 344 causing it to open and to apply a ground level signal to the input terminal 352 of the AND-gate 350 causing it to close and thereby reset the flip-flop.

To delay the trigger signal from the high-low frequency detector 118, the time delay 336 includes a 2N3794, NPN-transistor 358, a 150 microfarad capacitor 360, and a constant current generator. The constant current generator includes a 2N4304 field effect transistor 362 having its drain electrode electrically connected to the positive terminal 168 of a 5.4 volt battery and having its source electrically connected to the following elements and components in series in the order named, which are (1) a 330K resistor 364; (2) the gate of the field effect transistor 362; (3) a 1N4198 diode 366, the anode of the diode 366, being connected to the gate of the field effect transistor 362; (4) the collector of the transistor 358; (5) the capacitor 360; and (6) the DC return 368. The resistor 364 and the field effect transistor 362 act as a constant current generator to either charge the capacitor 360 or conduct current through the transistors 358.

To control the charging of the capacitor 360 from the constant current generator, the transistor 358 includes a base electrode connected through the following two paths, which are: (1) through a 4.7K resistor 370 to its emitter and to the negative terminal 184 of the 5.4 volt battery and (2) through a 1N753A zener diode 372, being directly connected to its anode. The current may flow through the diode 154 to either the positive terminal 168 of a 5.4 volt battery through the 10K resistor 374 or to the high-low frequency detector 118.

In operation, the transistor 358 is normally conducting so that current flows from the positive terminal 168 of the 5.4 volt source through the following: (1) the field effect transistor 362, (2) the resistor 364, (3) the diode 366, (4) the transistor 358, and (5) the negative terminal 184 of the 5.4 volt battery. To maintain the transistor 358 in its conducting state, the positive output voltage from the AND-gate 350 blocks the diode 154. When the diode 154 is blocked, the current through the resistor 374 is reduced causing the voltage at the cathode of zener diode 372 to exceed the breakdown point of the diode causing a positive voltage to appear at the base of the transistor 358, forward biasing it heavily into the conduction region. When the transistor 358 is conducting heavily, the voltage at the anode of the diode 366 is negative and this voltage is applied to the motor current control circuit 338 to maintain the current flow through the motor 38 so that it continues to rotate the endless magnetic belt 32.

To stop the motor 38, a pulse that is first at a negative potential and then at ground level is applied from the high-low frequency detector 118 to the cathode of the diode 154, unblocking this diode. The current from the positive terminal 168 now flows through the resistor 374 and the diode 154 causing the potential at the cathode of the zener diode 372 to drop below its breakdown point. The potential at the base of the transistor 358 now drops to a negative value causing the transistor to become nonconducting. When the transistor 358 is nonconducting, the current from the constant current generator charges the capacitor 360. After this capacitor has charged for 1 minute, the potential at the plate of the capacitor and the anode of the diode 366 is sufficient to apply the positive voltage to the current control circuit 338 to stop the motor 38. At the same time, the potential is large enough to cause the transistor 358 to return to its conducting state.

To control the current through the motor 38, the motor current control circuit 338 includes: (1) a 2N3904 transistor 376 that controls the speed of the motor 38; (2) a first 2N3794 transistor 378 and a second 2N3794 transistor 380 to start and stop the motor 38; and (3) a 2N3794 transistor 382 to receive the input voltages from the time delay and to control the transistors 380 and 378 in response to these voltages.

To control the speed of the motor 38, the base of the transistor 376 is electrically connected to a first end of the armature of the motor 38 through a 2.2K resistor 384 and to the other end of the armature of the motor 38 through a 10K resistor 386. The emitter of the transistor 376 is connected to: (1) the cathode of a 1N4370A zener diode 388, the anode of the zener diode being connected to the DC return 368; and (2) the first side of the armature through a 2.7K resistor 390. The collector of the transistor 376 is connected through the following elements in series in the order named: (1) a 2.4K resistor 392; (2) the base of the transistor 380; (3) the collector of the transistor 382; (4) the collector of a 2N4288 transistor 394; (5) the emitter of the transistor 394; (6) a 1K resistor 396; and (7) the positive terminal 168 of a 5.4 volt battery. The base of the transistor 394 is connected to: (1) the cathode of a diode 398, the anode of the diode 398 being connected to the positive terminal 168 of the 5.4 volt battery and (2) to the DC return through a 4.7K resistor 400.

In operation, the countervoltage across the armature of the motor 38 also appears across the resistors 384 and 386 which are connected to the base of the transistor 376. As the speed of the motor 38 increases, the countervoltage increases driving the transistor 376 more heavily into conduction and as the motor slows down, the countervoltage is reduced causing the transistor 376 to conduct less heavily. When the transistor conducts heavily more current is drawn through the resistor 396, causing the base of the transistor 380 to fall in potential, which in turn causes the base of the transistor 378 to fall in potential and reduces the current through the motor, slowing it down. The reverse happens when the transistor 376 does not conduct as heavily. With this mechanization the current through and therefore the speed of the motor 38 is regulated by the transistor 376.

To stop the motor 38 when a positive pulse is applied to the motor current control unit 338 from the time delay 336, the base of the transistor 382 is electrically connected to the anode of the diode 366. While the transistor 358 in the time delay 336 is conducting, the anode of the diode 366 is sufficiently low in potential so that the transistor 382 does not conduct. When the transistor 382 is nonconducting, the transistor 378 conducts full current through the armature of the motor 38 so that it continues to rotate the endless magnetic tape 32. However, when a positive pulse is applied to the base of the transistor 382 from the time delay 336, the transistor 382 begins conducting heavily and pulls current from the base of the transistor 380. The transistor 380 in turn becomes less conductive and turns off the transistor 378 to prevent current from flowing through the armature of the motor 38 thereby stopping the motor.

To provide a signal to the alarm circuit 60, a diode 402 has its cathode electrically connected to the armature of the motor 38 and has its anode electrically connected to input terminal 404 of the audible alarm circuit 60. The terminal 404 is electrically connected to the positive terminal 168 of a 5.4 volt battery 168 through a 4.7K resistor 406 and to ground through the following elements which are: (1) a diode 408 having its anode directly connected to the terminal 404; (2) the base of a 2N4286 transistor 410; and (3) a 4.7K resistor 412 connected at its far end to the ground terminal 110.

To provide an audible alarm, the audible alarm circuit 60 includes a piezoelectric disc 414 and a multivibrator 416. The multivibrator 416 includes a first inverting AND-gate 418 having a first input terminal 420 and a second input terminal 422 and a second inverting AND-gate 424 having a first input terminal 426 and a second input terminal 428. These AND gates are the same as the AND-gates 344 and 350 within the high-low frequency detector 118. The output from the AND-gate 418 is electrically connected through a 0.1 microfarad capacitor 430 to: (1) both inputs 426 and 428 of the AND-gate 424; (2) to the collector of the transistor 410; and (3) to one end of a 2.2K resistor 432, the other end of the resistor 432 being grounded to the terminal 110. The output of the AND-gate 424 is electrically connected to the following units: (1) to the ground terminal 110 through a 0.082 microfarad capacitor 434; (2) to ground through the piezoelectric disc 414; and (3) through a 0.1 microfarad capacitor 436 to both input terminals 420 and 422 of the AND-gate 418 and to one end of a 2.2K resistor 438, the other end of the resistor 438 being grounded to the terminal 110.

In operation, the transistor 410 is normally conducting to ground the input terminals 426 and 428 of the AND-gate 424. While the transistor 410 is conducting, the multivibrator that includes the AND-gates 418 and 424 cannot change state since the AND-gate 424 always has its input terminals grounded. However, when the potential terminal 404 drops because the motor 38 has stopped, the transistor 410 becomes nonconducting permitting the multivibrator to provide alternating current across the piezoelectric crystal 414. During this time the piezoelectric crystal 414 emits an audible alarm.

The motor 38 is a small low torque motor and drives the endless magnetic tape 32 at the low rate of speed of five-eighths of an inch per second rather than the rate of speed of 7½ inches per second which is more conventional. Nevertheless, the fidelity of the portable tape recorder is sufficiently high. The use of a low torque motor enables the portable tape recorder to be smaller in size than would otherwise be possible.

Although a specific embodiment of the invention has been described with a certain amount of particularity, many modifications and variations are possible in the invention and in the light of the above teachings. It is therefore to be understood that, within the scope of the appended claims, the invention may be practiced otherwise then as specifically described.

What is claimed is:

1. A method of monitoring an electrical representation of the heartbeat obtained from an ambulatory subject comprising steps of:
   continuously recording a characteristic of the heartbeat representation on a recording medium of predetermined capacity carried on the subject;
   continuously erasing the recording of the characteristic from the medium as new heartbeat characteristic information is recorded so that the medium contains a recording of the most recent characteristic within the capacity of the recording medium;
   detecting an abnormality in the heartbeat from the electrical representation and stopping said recording a fixed period of time after said abnormality occurs, the fixed period of time being less than the capacity of the medium so as to preserve a portion of the characteristic recording both before and after the occurrence of the abnormality; and thereafter actuating an alarm near said subject.

2. A method according to claim 1 wherein the step of recording the characteristic is further defined as recording the characteristic on a track of a moving endless tape, said track having a predetermined capacity.

3. A method according to claim 1 in which the step of actuating an alarm includes the step of actuating an alarm after the recording has stopped and the method further includes the steps of providing an additional recording medium and reinitiating the recording on the additional recording medium to repeat the operation after the alarm has been actuated.

4. A method according to claim 1 in which the step of recording a characteristic includes the steps of:
   moving a magnetic tape at a speed of less than 1⅞ inches per second with respect to a recording head;
   establishing a carrier signal of predetermined frequency;
   modulating the frequency of the carrier signal in accordance with the characteristic of the heartbeat representation; and
   supplying the frequency modulated signal to said recording head.

5. A method according to claim 1 wherein said electrical representation includes the heartbeat rate and wherein the step of detecting an abnormality includes the step of detecting from said electrical representation the departure of the rate of said heartbeat from a predetermined range.

6. A method according to claim 2 in which the step of actuating an alarm includes the step of sounding an audible alarm and the method further includes the steps of providing another endless tape and reinitiating the recording on the second endless tape to repeat the operation after the alarm has been actuated.

7. A method according to claim 1 in which the step of detecting an abnormality includes the step of indicating on the recording medium when an abnormality is detected.

8. A method according to claim 5 in which the step of detecting an abnormality includes the step of varying the limits of the predetermined range.

9. A method according to claim 1 including the step of manually initiating a stopping of the recording in the event an abnormality is not detected and stopping said recording a fixed period of time after initiation, the fixed period of time being less than the capacity of the recording medium so as to preserve a portion of the characteristic recording both before and after initiation, and thereafter actuating the alarm near said subject.

10. A method according to claim 1 including the additional step of playing back the recording and perceiving the characteristic of the heartbeat.

11. A method according to claim 10 wherein the step of continuously recording is further defined as simultaneously recording a characteristic of the heartbeat representation and reference timing signals on tracks of a moving endless tape and the step of playing back the recording is further defined as regulating the movement of the endless tape during playback by means of the reference timing signals.

12. A method according to claim 11 wherein the step of playing back the recording is further defined as altering the perception of the characteristic of the heartbeat by means of the reference timing signals.

13. A portable tape recorder for monitoring the heartbeat of a subject, said recorder being connectable to electrode means adapted to obtain an electrical representation of the subject's heartbeat and comprising:
   a casing supportable from the body of the subject;
   a recorder held within the casing and couplable to said electrode means, said recorder including:
   an endless recording tape;
   drive means for engaging and moving said endless recording tape;

recording means for recording a characteristic of the electrical representation obtained on said electrode means onto said endless tape as it moves so that said tape always contains the most recently received characteristic of the heartbeat recorded upon it;

detector means responsive to the electrical representation obtained on said electrode means for detecting when said heart beat becomes abnormal;

a drive means control, coupled to said detector means, for stopping said drive means a predetermined time after said detector means detects said abnormality; and alarm means, responsive to said detector means, for providing an indication to the subject.

14. A portable tape recorder according to claim 20 in which said alarm means includes a means for providing an audible alarm after the drive means has stopped.

15. A portable tape recorder according to claim 13 in which the electrode means obtains an electrical signal representing the QRS complex of the subject's heartbeat, said recorder including an FM modulator means in said recording means couplable to said electrode means for frequency modulating said signal.

16. A portable tape recorder according to claim 13 which the electrode means obtains an electrical representation including the subject's heartbeat rate and said detector means includes means for determining when the frequency of the electrical representation departs from a predetermined range.

17. A portable tape recorder according to claim 16 in which the electrode obtains an electrical signal representing the frequency of the subject's heartbeat and said detector means comprises:

signal processor means for providing a DC-output signal that varies in proportion to the frequency of the electrode means electrical signal;

first and second adjustable means for providing first and second DC reference potentials establishing thereinbetween a range of voltages representing normal values of said DC-output signal; and a comparator for comparing said DC-output signal from said signal processor means with said DC reference potentials and providing a trigger signal for actuating said drive means control to initiate stoppage of said drive means whenever said DC-output signal from said signal processor means does not have an amplitude that is between the amplitudes of said two DC reference potentials.

18. A portable tape recorder according to claim 13 in which said drive means is adapted to receive a replaceable endless recording tape.

19. A portable tape recorder according to claim 13 in which said drive means control includes a drive means stopping circuit and a time delay, said time delay being connected between said detector means and said drive means stopping circuit.

20. A portable tape recorder according to claim 13 in which said alarm means includes means providing an audible signal upon the application of alternating voltage thereto, a circuit means for generating an alternating voltage and applying said alternating voltage to said audible signal means, and an electronic switch means for disabling said circuit means while said electronic switch means is receiving a voltage, said electronic switch means being electrically connected to said drive means for receiving a voltage therefrom while said drive means running, thereby to disable said circuit means.

21. A portable tape recorder according to claim 13 wherein said detector means is coupled to said recording means for providing an indication on said tape when said heartbeat becomes abnormal.

22. A portable tape recorder according to claim 16 wherein said detector means includes means for varying the limits of the predetermined range.

23. A portable tape recorder according to claim 13 including means actuable by the subject and electrically connected to said drive means control for stopping said drive means a predetermined time after actuation.

24. A portable tape recorder according to claim 13 including a reference recording means for recording reference timing signals on said endless recording tape.

25. A portable tape recorder according to claim 24 wherein said reference recording means includes oscillator means for recording reference timing signals of a predetermined frequency on said endless recording tape.

* * * * *